3,244,253
ACOUSTIC LOGGING SYSTEMS
Robert B. Blizard, Littleton, Colo., assignor to Schlumberger Well Surveying Corporation, Houston, Tex., a corporation of Texas
Filed Dec. 23, 1959, Ser. No. 861,503
16 Claims. (Cl. 181—.5)

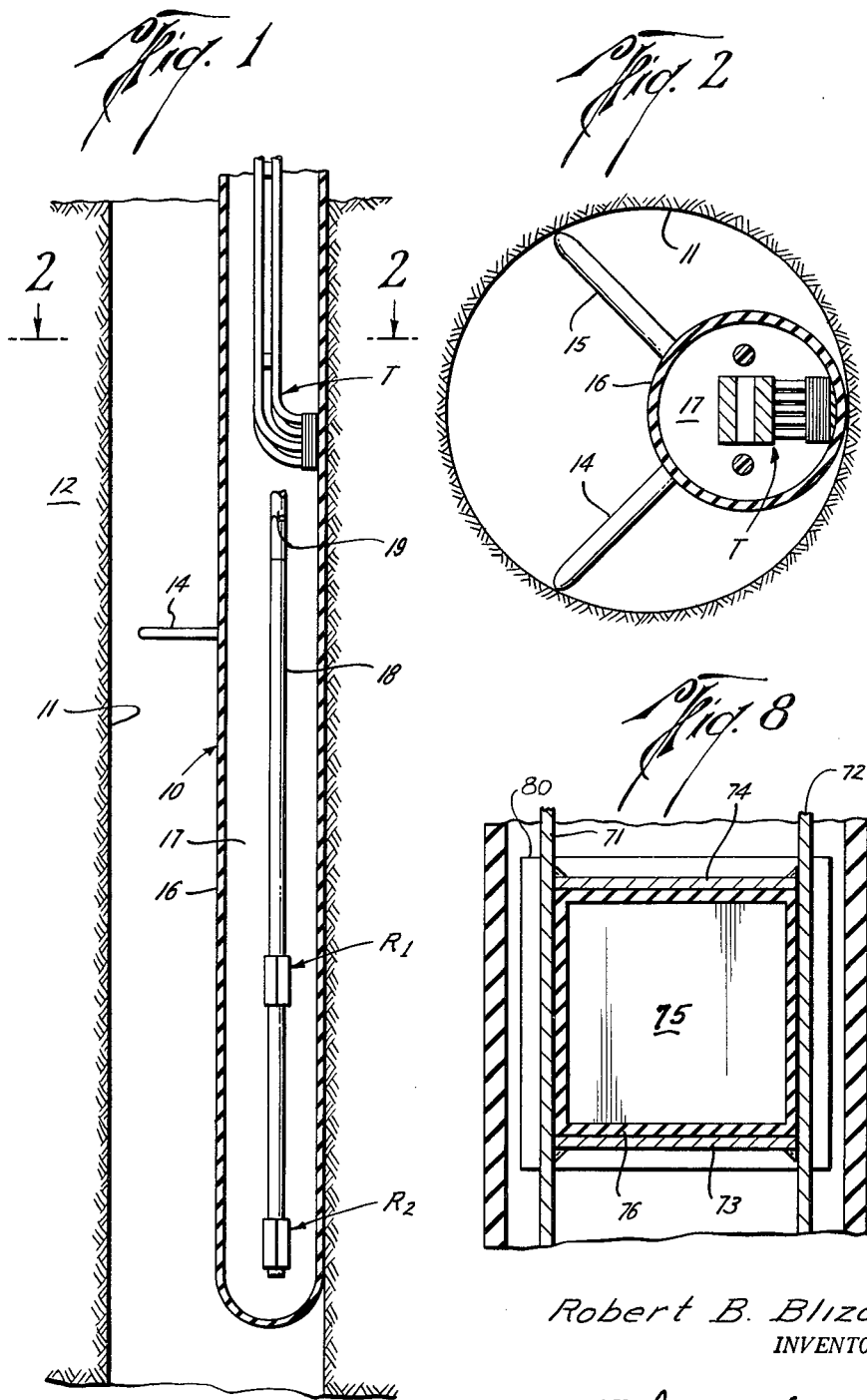

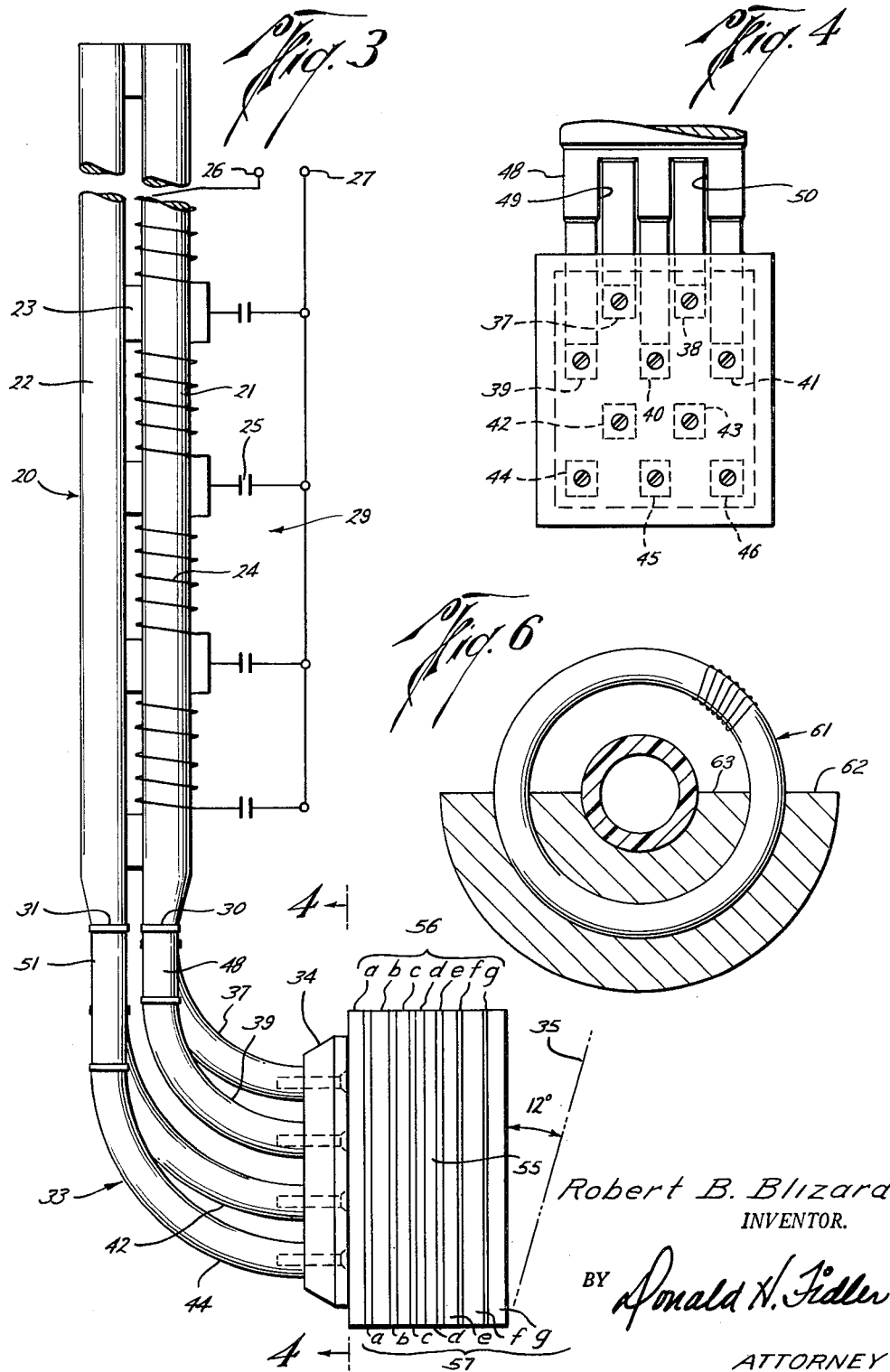

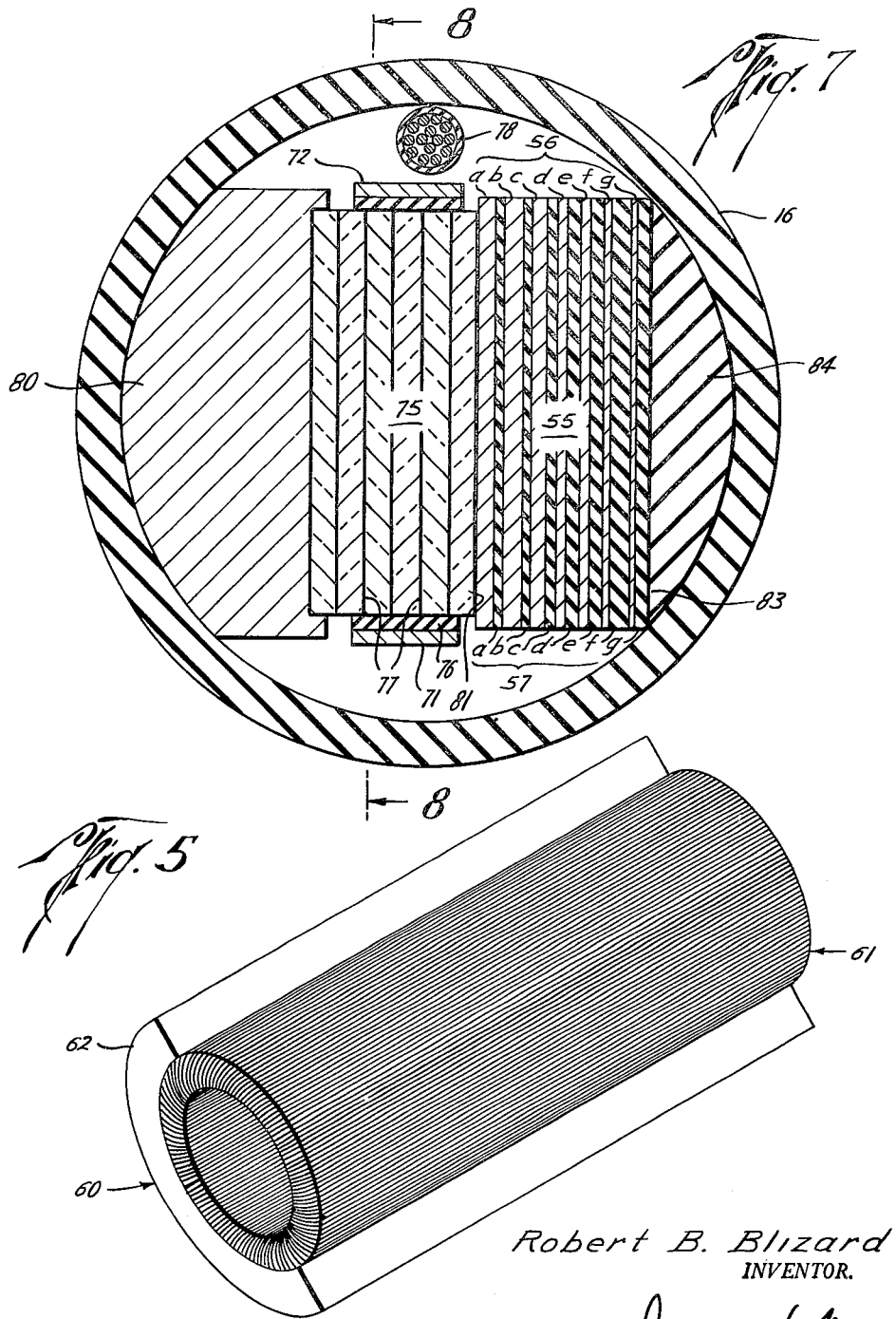

The present invention, generally, relates to acoustic logging apparatus and, more particularly, to transducer apparatus for developing and detecting directed impulses of acoustic energy in a bore traversing earth formations, although it is not limited to such use.

In general, magnetostrictive transducer apparatus used heretofore has been comprised of a short, hollow, cylindrical core member having a toroidal winding thereon. When a pulse of electric current is applied to the winding, the magnetostriction effect causes a pulse of acoustic energy to be radiated from the outer surface of the core member. While such apparatus is effective, it is not entirely satisfactory because the magnitude of the acoustic energy pulse that can be developed is limited by restrictions imposed on the apparatus by reason of its use in an earth bore.

It is an object of the invention, accordingly, to provide new and improved electroacoustic transducer apparatus that is capable of producing and detecting within the confines of a bore drilled into the earth an acoustical signal of greater strength than has been possible heretofore.

Another object of the present invention is to provide a more efficient coupling between an electroacoustic transducer apparatus and the earth formations in the vicinity of a bore.

Yet another object of the invention is to provide an electroacoustic transducer apparatus embodying more effective coupling between the electrical and the acoustic elements of the apparatus.

A further object of the present invention is the provision of an electroacoustic transducer apparatus which permits a more effective impedance match between the acoustic transducer apparatus and the bore.

A still further object of the invention is the provision of an electroacoustic transducer apparatus having improved directional characteristics whereby the direction of the acoustic energy output is controlled in both elevation and azimuth to permit a more effective acoustic radiation pattern.

These and other objects of the invention are attained by an electroacoustic transducer apparatus having a transducer member capable of developing acoustical energy which is emitted at an angle into a formation, means for coupling the acoustic output from the transducer member to the bore wall of the well bore through an impedance matching device to provide a directional emission of acoustic energy and improve efficiency of transmission of the energy into the formation, and directional receiver means to detect the acoustic energy at spaced locations from the transducer.

The invention may be better understood from the following detailed description of several representative embodiments taken in conjunction with the accompanying drawings, in which:

FIG. 1 is a cross-sectional partial view in elevation of a cross-section of the earth and showing apparatus embodying the present invention to provide directional coupling between the output of a transducer and the bore wall and directional reception of the acoustic energy;

FIG. 2 is a cross-section taken along line 2—2 of FIG. 1;

FIG. 3 is a schematic diagram of transducer apparatus constructed in accordance with the invention;

FIG. 4 is a view taken along line 4—4 of FIG. 3;

FIG. 5 illustrates a view of directional receiver apparatus embodying the present invention;

FIG. 6 is a cross-section view of another form of the directional receiver apparatus of FIG. 5;

FIG. 7 is a cross-sectional view of impedance coupling apparatus embodying the present invention together with a transducer; and FIG. 8 is a view in cross-section taken longitudinally of the apparatus of FIG. 7 along line 8—8 and reduced in scale.

Referring now to FIG. 1, borehole apparatus 10 embodying the present invention is adapted to be transported through a fluid-filled bore 11 which traverses earth formations 12 by means of a customary cable and winch (not shown). Borehole apparatus 10 contains an acoustic transmitter T which provides a directional emission of acoustic energy and also receivers $R_1$ and $R_2$ which are spaced from one another and from the transmitter. Receivers $R_1$ and $R_2$ are constructed and arranged to directionally detect the emitted acoustic energy traveling through the earth formations. To obtain the full effect of the directional propagation of acoustic energy, the apparatus 10 is adapted to be displaced toward one side of the borehole so as to be eccentrically disposed with respect to the borehole axis by means of eccentralizer fingers or arms 14, 15 (FIG. 2) constructed for example of rubber and serving to urge one face or portion of the apparatus 10 against the wall of the bore.

As shown in FIGS. 1 and 2, apparatus 10 includes a support member comprised of a cartridge section (not shown) for electrical assemblies and a tubular housing 16 constructed of semirigid, yet resilient material containing a fluid 17 in which the transmitter and receivers are suitably suspended, the fluid-filled interior of the housing being suitably pressure-balanced with respect to the exterior in a well-known manner. The suspension for the receivers may be, for example, a Teflon rod 18, which extends upwardly to a bifurcated portion 19 straddling the transmitter T and is in turn connected to the conventional rigid cartridge section of the apparatus (not shown). The transmitter T may also be secured at its upper end to the cartridge section of the apparatus.

Referring now to FIG. 3, an electroacoustic transducer 20 is shown which includes a pair of parallel bars 21 and 22 formed of magnetostrictive material positioned in laterally spaced apart relation by longitudinally spaced apart magnetic shunts 23. Each of the bars 21 and 22 is substantially rectangular in cross section and is formed of stacked laminations extending parallel to the plane of the drawing in FIG. 3 to reduce eddy current losses. The material of which the bars 21 and 22 are formed, for example, may be cobalt-iron alloy marketed as "2V Permendur," annealed 1.25 hours at 550° centigrade in a hydrogen atmosphere. Series-connected electrical windings 24, which are part of an electrical delay line 29, are positioned about the bar 21 between adjacent magnetic shunts 23. Similar windings (not shown) may also be provided on the bar 22 to reduce effects developed by stray electrical and magnetic fields.

Each of the windings 24 forms an inductive coupling with the bar 21, and condensers 25 are connected as shown in FIG. 3 of the drawings to form a simple electrical delay line 29. Terminals 26 and 27 provide input means for electrical pulses to be applied to the delay line 29. The values of the inductances of the windings 24 and the capacitances 25 are suitably selected to give a velocity of propagation along or down the delay line 29 equal to the velocity of sound in the magnetostrictive bar 21.

The transducer 20 may be energized by connecting to its terminals 26 and 27 a conventional electrical energizing circuit which provides a surge or pulse of current to initiate an acoustic impulse in the bar 21.

The velocity of propagation of the electric pulse on the electrical delay line 29 is adjusted to equal the acoustic velocity in the bars so that all the stress impulse waves which travel along the bars in one direction reach the output ends 30, 31 at the same time and add up to make a single acoustic pulse of large amplitude.

Of course, the energy developed in the acoustic wave is limited by the amount of energy initially existing in the electrical wave. Therefore, after the electrical wave has delivered all of its energy to the acoustic wave, there is no further increase in the energy of the acoustic wave.

For a more detailed analysis of the operation of the apparatus shown in FIG. 3, reference may be made to my copending application Serial No. 830,147, filed July 28, 1959; granted June 23, 1964 as Patent No. 3,138,219.

At the output ends 30, 31 of bars 21, 22, a curved coupling device 33 transmits the acoustic energy to a flat plate member 34 which lies in a plane parallel to the longitudinal axis of bars 21, 22. In order that acoustic energy may be most efficiently transmitted to high velocity formations as well as low velocity formations, the energy should be propagated into the formations along a wavefront at an angle of approximately 12° with respect to the vertical as shown by the line 35 in FIG. 3 which represents an acoustic wavefront. Hence, the energy should be delayed in time from the upper to the lower edge of the plate member 34 by an amount varying uniformly from a minimum to a maximum value to form the wavefront 35. The coupling device 33 employs different lengths of coupling members and different materials to accomplish the desired delay time to provide the wavefront 35. Also to obtain improved wavefront formation, a number of independent couplings 37–46 (FIG. 4) couple the bars to various locations on the plate member 34.

In particular, in the coupling device 33, bar 21 has a rectangular steel member 48 attached to its output face 30. Member 48 contains slots 49, 50 which extend towards face 30 of member 21 and are spaced so that the width of member 48 is equally divided in 5 sections, the slots 49, 50 being the second and fourth sections and receiving the short, curved, rectangularly, cross-sectioned brass couplings 37, 38 which are connected to an uppermost location on the plate member 34. Brass couplings 39–41 of similar length and configuration are attached to the lowermost ends of the remaining sections of member 48 and are connected to a location on the plate member 34 immediately below and laterally spaced from the brass couplings 37, 38. In this manner, the acoustic energy to the second set of couplings 39–41 is delayed by the length of steel in the central and outer sections of member 48 a slightly longer time than the acoustic energy entering the first set of couplings 37, 38 at the upper ends of slots 49, 50.

In a like manner, bar 22 of the transducer 50 has a rectangular steel member 51 attached to its output face 31, the member 51 being longer than member 48 in the direction of acoustic pulse travel. Member 51 is also divided into five sections, the second and fourth sections having slots (not shown) which receive relatively long curved Monel couplings 42, 43, the couplings 42, 43 being attached to the plate member 34 at a location below couplings 39–41. The path through which acoustic energy travels is made longer by the member 51 and couplings 42, 43 so that the arrival of energy at the plate member 34 is delayed relative to its arrival at locations above couplings 42, 43. Couplings 44–46, similar to couplings 42, 43, are attached to the remaining longer sections of member 51 and to the plate member 34 at a location below couplings 42, 43 so that the arrival of energy at the lower edge of plate member 34 is delayed relative to arrival at the locations above couplings 44–46. In this manner, the angle of wavefront 35 may be controlled or predetermined.

An impedance matching device 55, as explained more fully hereafter, may be composed of a stack of interleaved brass and rubber sections 56(a–g), 57(a–g). To provide a practical example, device 55 may be dimensioned as follows, commencing from the brass section 56a adjacent plate member 34 to the forward face of the stacked sections:

| Brass Section (inch) | Rubber Section (inch) |
| --- | --- |
| (a) 0.0359 | 0.0150 |
| (b) 0.0641 | 0.0312 |
| (c) 0.0508 | 0.0312 |
| (d) 0.0320 | 0.0625 |
| (e) 0.0226 | 0.0625 |
| (f) 0.0089 | 0.0938 |
| (g) 0.0031 | 0.0625 |

Referring now to FIGS. 1 and 5, each of receivers $R_1$ and $R_2$ preferably has the form of a transducer 60 comprised of a cylindrically shaped core member and coil winding assembly generally identified by the numeral 61 wherein the core member is constructed of magnetostrictive material and the coil is toroidally wound on the core member. The core member and coil winding 61 are partially received within a semitubular shell member 62 constructed of a heavy material, say, brass. The coil winding and core may be mounted on cylindrical rod 18. The relatively large mass of the shell member 62 shields the back half of the transducer 60 from acoustic pressure waves due to noise, thereby enhancing the quality of the directionally intercepted signal from the bore wall.

As shown in FIG. 6, a semitubular mass 63 of metal may also be inserted within the back half of the assembly 61 so that, in a similar manner, only the portion of the transducer 60 facing the formations will react to pressure waves.

In operation, the apparatus is first lowered to a location below the section of the bore to be logged. At this time and during the following logging run in which the apparatus is moved upwardly the eccentralizing fingers 14, 15 maintain a portion of the apparatus against the wall of the bore. The transmitter T carried by the apparatus has a forward face plate member 34 aligned with respect to the eccentralizing fingers so as to face the portion of the apparatus which is in contacting relationship with the wall of the bore. Thus, acoustic wave energy generated by the acoustic transducer 20 is coupled by the coupling device 33 to the face plate member 34 and is directed into the bore, the energy having a wave front 35 formed by the construction and arrangement of the coupling device 33. The acoustic energy travels through the formations and intercepts receivers $R_1$ and $R_2$ in succession. Each of the receivers is shielded except for a portion facing the portion of apparatus which contacts the bore so that effects of stray noise are decreased. The shielded portion of the receivers is, of course, aligned relative to the transmitter and eccentralizing fingers so that the directional characteristics of the apparatus are maintained.

Referring now to FIGS. 7 and 8, the theory of the impedance coupling device 55 of FIG. 3 will be explained in connection with another form of transducer to provide a basic understanding of the impedance matching arrangement. Supported within the tubular housing 16, are a pair of parallel arranged strip support members 71, 72 which extend longitudinally of the housing, and at a given location, a pair of transverse strip members 73, 74 (FIG. 8) form a more or less rectangular opening which receives a composite piezoelectric transducer 75 suitably isolated acoustically from the strip members by means of insulation 76, such as rubber. The piezoelectric transducer 75 is comprised, for example, of a series or stack of six ceramic plates which are separated from one another by brass foil members 77. Alternate pieces of brass foil 77 are coupled to respective terminals (not shown) of a multiconductor cable 78 so that when a surge of electrical power is applied across the terminals, the dimensions of the transducer change due to the electrostrictive properties of the plates comprising the transducer. A suitable backup mass 80 of metal is disposed at one end of the transducer and, of course, tends to resist movement so that the movement occurs primarily towards the forward face 81 of the transducer stack. Suitably bonded to the forward face 81 of the transducer is the impedance matching device 55 comprised of a stack of alternate layers of different materials 56(*a–g*) and 57(*a–g*) having differing acoustic impedance properties. The forward face 83 of the impedance matching stack 55 abuts a fill-in material 84, for example rubber, which couples the forward face 83 of the impedance matching device 55 to the housing 16 adjacent the portion of the housing which is urged against the wall of the bore.

The impedance matching device 55 serves to match the impedance of the transducer 75 to the impedance of the housing and thence of the formations and thus effects a higher transmission of acoustic energy into the formation. In order to understand the nature of the impedance matching device, the theory of design will now be presented.

BASIC THEORY

A. *Low frequency approximation*

Consider first a stack of alternate plane layers of two materials where the acoustic properties of the composite stack of materials are such that the wave fronts of acoustic energy transmitted are parallel to the layers and the wavelength of the acoustic energy is much greater than the thickness of any layer. The sound velocity in this case is given by the expression:

$$C^* = \sqrt{M^*/\rho} \qquad (1)$$

where $M^*$ is the elastic modulus of the composite and $\bar{\rho}$ is the average density. For a stack of thin sheets with lateral dimensions large compared to the wavelength, the appropriate modulus to use is the bulk modulus, which is equal to $\rho C^2$ where $C$ is the velocity of plane compressional waves in an infinite medium and $\rho$ is the density of the material.

It turns out that it is possible to obtain a simpler expression for the composite velocity and the composite impedance if use is made of the concept of the "fractional time $a$ that a wave spends in one of the materials." Therefore, let the respective thicknesses of each layer of the respective materials be $s_1$ and $s_2$, and let the sound velocities be $C_1$ and $C_2$. Then the quantity $a$ may be defined as:

$$a = \frac{s_1/C_1}{s_1/C_1 + s_2/C_2} \qquad (2)$$

The ratio $b$ of impedances of the respective materials may be defined as:

$$b = \frac{\rho_1 C_1}{\rho_2 C_2} \qquad (3)$$

where $\rho_1$ and $\rho_2$ are the densities of the component materials.

The average density for the entire stack is:

$$\bar{\rho} = \frac{aC_1\rho_1 + (1-a)C_2\rho_2}{aC_1 + (1-a)C_2} \qquad (4)$$

and the composite modulus for the entire stack is given by the expression:

$$1/M^* = \frac{aC_1M_1 + (1-a)C_2/M_2}{aC_1 + (1-a)C_2} \qquad (5)$$

By substituting $1/\rho_1 C^2$ for $1/M_1$ and $1/\rho_2 C^2$ for $1/M_2$, the moduluses can be eliminated from Equation 5. This gives an expression:

$$1/M^* = \frac{a/\rho_1 C_1 + (1-a)/\rho_2 C_2}{a(C_1 + (1-a)C_2)} \qquad (6)$$

The composite velocity is now obtained by combining Equation 4 and Equation 6 so that:

$$C^{*2} = M^*/\bar{\rho} = \frac{(aC_1 + (1-a)C_2)^2}{[a/\rho_1 C_1 + (1-a)/\rho_2 C_2][a\rho_1 C_1 + (1-a)\rho_2 C_2]} \qquad (7)$$

This expression may be simplified by the introduction of $b$ as defined above so that $$C^{*2} = \frac{\bar{C}^2}{1 + (b - 2 + 1/b)a(1-a)} \qquad (8)$$

where $\bar{C} = aC_1 + (1-a)C_2$ and is the "time average velocity."

The composite impedance $Z$ is then given by the expression:

$$Z^{*2} = \bar{\rho}M^* = [\rho_1 C_1 \rho_2 C_2] \frac{a + (1-a)b}{(1-a) + ab} \qquad (9)$$

B. *Upper cut-off frequency*

The preceding analysis is valid for low frequencies. Now, it must be determined what the limit of validity is, so that the thickness of the layers which will pass the desired band of frequencies can be determined. The proper way to do this would be to make an exact analysis of the transmission characteristics of an interactive network consisting of alternate pieces of transmission lines of different characteristic impedances. This problem, while certainly soluble, is more or less complicated, and instead it is possible to estimate the cut-off frequency by analogy with the simple constant $k$ low-pass filter. Here the cut-off frequency $\omega_{hc}$ is given by the expression;

$$\omega_{hc} = 2\tau \qquad (10)$$

when $\tau$ is the delay per section at low frequencies. By analogy with the LC filter, a "section" of the laminated structure may be considered as extending from the mid-plane of one layer to the mid-plane of the next layer of the same material.

C. *Impedance change*

By varying the proportions of the two components of the stack it is possible to obtain any impedance between the impedance values for the pure materials. Hence, if acoustic energy must be transmitted from a medium of one impedance value to another medium of greatly different impedance value, it can be done more efficiently by interposing a stack in which the impedance varies by small steps and matching the impedance at both ends.

To get the desired ratio of impedances in as thin a pad as possible, the impedance should be made to vary exponentially with the propagation time. Thus, if each section of the laminated structure has the same delay $\tau$, then the ratio of the impedance of the $n$'th section to that of the $(n-1)$th section is given by the expression:

$$Z^*n/Z^*n-1 = s \qquad (11)$$

where $s$ is the ratio of the impedance of successive adjacent sections and is a constant throughout the matching pad.

By analogy with the exponential horn, the low-frequency cut-off is given by the expression:

$$\omega_{lc} = (\ln s)/2\tau \qquad (12)$$

where $\tau$ is again the delay per section. By combining Equations 10 and 12, an expression for the ratio $D$ of high to low cut-off frequencies may be obtained where $$D = \omega_{hc}/\omega_{lc} = 4/\ln s \quad (13)$$

Thus, if there are N sections, the ratio $s$ of input to output impedances is given by the expression:

$$\ln s = (\ln S)/N \quad (14)$$

Substituting Equation 14 in Equation 13 yields $$N = \frac{D \ln S}{4} \quad (15)$$

which enables a prediction as to the number of sections required in terms of the relative band width and the matching ratio.

From the foregoing equations, design of an impedance matching stack 55 may be accomplished to match the impedance of the transducer 75 to the impedance of the rubber in housing 16 with a gradual transition of impedance values across the stack so that increased efficiency in coupling the acoustic energy to the formations is realized.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

What is claimed is:

1. An acoustic logging apparatus comprising: a tubular housing constructed of material having a relatively low acoustic velocity and impedance, an electroacoustic transducer in said housing and having a relatively high output impedance, and means for acoustically coupling said transducer transversely to said housing in impedance matched relation comprising a stack of high and low impedance materials interleaved between said transducer and said housing, the thickness of layers of one material decreasing and the thickness of layers of the other material increasing from one end of the stack to the other.

2. An acoustic logging apparatus comprising: a tubular housing constructed of material having a relatively low acoustic velocity and impedance, an electroacoustic transducer in said housing and having a relatively high output impedance, and means for acoustically coupling said transducer transversely to said housing comprising a stack of interleaved materials of higher and lower acoustic impedance, the thicknesses of the respective materials varying from one end of the stack to the other to maintain constant throughout the stack the ratio of impedances between adjacent sections each including a layer of said higher impedance material and a layer of said lower impedance material.

3. An acoustic logging apparatus comprising: a tubular housing constructed of material having a relatively low acoustic velocity and impedance, an electroacoustic transducer in said housing and having a relatively high output impedance, and means for acoustically coupling said transducer transversely to said housing comprising a stack of interleaved materials of higher and lower acoustic impedance wherein the ratio of impedances between adjacent sections remains constant throughout the stack and wherein the thickness of layers of one material decreases and the thickness of the other material increases from one end of the stack to the other end, the thickness of layers varying approximately as an exponential function of distance from one end of said stack.

4. An acoustic logging apparatus comprising: a tubular housing constructed of material having a relatively low acoustic velocity and impedance, an electroacoustic transducer in said housing and having a relatively high output impedance, and means for acoustically coupling said transducer transversely to said housing comprising a stack of interleaved materials of higher and lower acoustic impedance, the thicknesses of the respective materials varying from one end of the stack to the other wherein the ratio of impedances between adjacent sections remains constant throughout the stack and wherein the time delay for acoustic energy to travel through said stack remains constant for successive sections of said stack.

5. Acoustic logging apparatus for use in a well bore comprising: a support adapted for transportation through a well bore; means to maintain said support eccentrically in said bore; acoustic transmitter means carried by said support including means for developing acoustic energy traveling longitudinally of said support, means for transmitting energy to said well bore arranged relative to said eccentrically maintaining means so as to be in vertical alignment with the portion of the support in contacting relation with the well bore and facing said support portion, means for coupling said developed acoustic energy to said transmitting means, and means for acoustically coupling said transmitting means transversely to said support portion comprising a stack of high and low impedance sections interleaved between said transmitting means and said support portion, the thickness of layers of one material decreasing and the thickness of layers of the other material increasing from one end of the stack to the other.

6. An acoustic transmitter device comprising: a support member adapted for transportation through a well bore; means carried by said support member for generating acoustic wave energy traveling longitudinally of said support means; a face plate member spaced axially of said generating means and carried by said support in a longitudinal plane, said face plate member having a longitudinal axis substantially parallel to the vertical axis of the bore; and coupling means connected between said generating means and said face plate member for transmitting the acoustic energy in a timed relationship relative to the longitudinal axis of the face plate member and including acoustic paths comprised of members of different lengths and materials arranged so that the arrival of acoustic energy at the face plate member forms a desired acoustic wavefront for emission from the face plate member.

7. An acoustic transmitter device comprising: a support member adapted for transportation through a well bore; means carried by said support member for generating acoustic wave energy traveling longitudinally of said support means; an elongated substantially flat face plate member spaced axially of said generating means and carried by said support in a lonigtudinal plane, said face plate member having a longitudinal axis substantially parallel to the vertical axis of the bore; and curved coupling means connected between said generating means and said face plate member for transmitting the acoustic energy in a timed relationship relative to the longitudinal axis of the face plate member and including acoustic paths comprised of members of different lengths and materials arranged so that the arrival of acoustic energy at the face plate member forms a desired acoustic wavefront for emission from the face plate member.

8. Acoustic logging apparatus for use in a well bore comprising: support means adapted for transportation through a well bore; means to maintain said support means eccentrically in the bore; acoustic transmitter means carried by said support means, said transmitter means including means arranged for generating acoustic wave energy longitudinally of said support means, said transmitter means having a relatively high output impedance portion disposed relative to said eccentrically maintaining means to be in confronting relationship to the portion of the support means which is normally in contacting relation with the well bore, said impedance portion comprising a face plate member spaced axially of said generating means and having a longitudinal axis substantially parallel to a vertical axis of the bore; and coupling means connecting said generating means and said face plate member for transmitting the acoustic energy in timed relationship relative to the longitudinal axis of the face plate member and including acoustic paths comprised of members of different lengths and materials arranged so that the arrival of acoustic energy at the face plate member forms a desired acoustic wavefront for emission from the face plate member; acoustic receiver means carried by said support means; and means for shielding the acoustic receiver means from acoustic energy except for a portion in vertical alignment with said face plate member and in confronting relationship to the portion of the housing member which is normally urged into contacting relation with the well bore.

9. Acoustic logging apparatus for use in a well bore comprising: support means adapted for transportation through a well bore, said support means including a tubular housing member constructed of a material having a relatively low acoustic velocity and impedance; means to maintain said housing member eccentrically in the bore; directional acoustic transmitter means carried by said support means and having a relatively high output impedance portion, means for acoustically coupling said output portion of said transmitter to said housing member of said support means comprising a stack of high and low impedance sections interleaved between said output portion and said housing member; acoustic receiver means responsive to acoustic energy transmitted by said transmitter means through formations surrounding the well bore carried by said support means; and means for shielding the acoustic receiver means from acoustic energy except for a portion in vertical alignment with said output portion and in confronting relationship to the portion of the housing member which is normally urged into contacting relation with the well bore.

10. Acoustic logging apparatus for use in a well bore comprising: support means including a tubular housing member constructed of a material having a relatively low acoustic velocity and impedance; means to maintain said support means eccentrically in the bore; acoustic transmitter means carried by said support means, said transmitter means including means arranged for generating acoustic wave energy longitudinally of said support means, said transmitter means having a relatively high output impedance portion disposed relative to said eccentrically maintaining means to be in confronting relationship to the portion of the housing member which is normally in contacting relation with the well bore, said impedance portion comprising a face plate member spaced axially of said generating means and having a longitudinal axis substantially parallel to a vertical axis of the bore; and coupling means connecting said generating means and said face plate member for transmitting the acoustic energy in timed relationship relative to the longitudinal axis of the face plate member and including acoustic paths comprised of members of different lengths and materials arranged so that the arrival of acoustic energy at the face plate member forms a desired acoustic wavefront for emission from the face plate member; and means for acoustically coupling said face plate member to said housing member of said support means comprising a stack of high and low impedance sections interleaved between said face plate member and said housing member.

11. Acoustic logging apparatus for use in a well bore comprising: an elongated support, longitudinally spaced acoustic transmitter and receiver means carried by said support and respectively, for directionally emitting and receiving acoustic impulses, means coupled to said support for normally displacing said support and acoustic means to one side of a well bore, said receiver means being comprised of a tubular core member of magnetostrictive material, coil windings on said core member and a semitubular acoustic shielding member enclosing said core member and coil windings permitting directional detecting of acoustic energy transmitted by said transmitter means through formations surrounding the well bore, said shield member being oriented relative to said displacing means so that the directional detection of acoustic energy is towards said one side of a well bore.

12. Acoustic logging apparatus for use in a well bore comprising: a hollow support adapted for transportation through a well bore; means to displace said support towards one wall of a well bore; directional acoustic transmitter means carried within said hollow support for receiving acoustic energy transmitted by said transmitter means through formations surrounding the well bore having an acoustic energy transmitting portion arranged relative to said displacing means so as to be in vertical alignment with the portion of the support closest to the wall of the well bore and emit acoustic energy through said support portion; and acoustic receiver means carried within said hollow support, said receiver means including a magnetostrictive tubular core member; a toroidal coil winding on said member, and means for shielding substantially one-half of the coil and core from effective receipt of acoustic energy including a semitubular shell acoustic shielding member extending longitudinally of said coil winding, the unshielded portion of said receiver means being arranged relative to said displacing means so as to be in vertical alignment with and facing said support portion which is closest to the wall of the well bore.

13. Acoustic logging apparatus for use in a well bore comprising: support means adapted for passage through a well bore, said support means including a tubular housing member constructed of a material having a relatively low acoustic velocity and impedance; acoustic transmitter means within said housing member, said transmitter means including means for generating acoustic wave energy longitudinally with respect to said housing member, an output flat face plate member in confronting relation to a wall portion of said housing member, and curved coupling means connected between said generating means and said face plate member, said coupling means including individual curved members providing acoustic paths, said members being comprised of different materials and having different lengths so that the arrival of acoustic energy at said face plate member forms a selected wavefront for emission from said face plate member; means for acoustically coupling said face plate member to said housing member of said support means and matching the impedance therebetween comprising a stack of high and low impedance sections interleaved between said face plate member and said housing member; acoustic receiver means carried by said support means; and means for shielding the acoustic receiver means from acoustic energy except for a portion in vertical alignment with said face plate member and in confronting relationship to said wall portion of the housing member so that acoustic energy is directional with respect to said housing member; and means on said housing means for displacing said support means towards one wall of a well bore, said displacing means being oriented to place said wall portion of said housing member adjacent said one wall of a well bore.

14. An acoustic receiver comprising: a magnetostrictive tubular core member; toroidal coil windings on said member; and means for shielding substantially one-half of the coil and core from effective receipt of acoustic energy including a semitubular acoustic shielding shell member extending longitudinally over the outer surface of said coil winding and an additional acoustic shielding member having a semicylindrical peripheral surface extending longitudinally over the inner surface of said coil winding opposite said shell member.

15. Acoustic logging apparatus for use in a well bore comprising: an elongated support; longitudinally spaced acoustic transmitter and receiver means carried by said support and respectively, for directionally emitting and receiving acoustic impulses; means coupled to said support for normally displacing said support and acoustic means to one side of a well bore; said receiver means being comprised of a tubular core member of magnetostrictive material, coil windings on said core member, a semitubular acoustic shielding member enclosing said core member and coil windings permitting directional detecting of acoustic energy, said shield member being oriented relative to said displacing means so that the directional detection of acoustic energy is toward said one side of a well bore, and an inner semitubular acoustic shielding member received within said bore member and aligned with said enclosing shield member.

16. Acoustic logging apparatus for use in a well bore comprising: an elongated support; longitudinally spaced acoustic transmitter and receiver means carried by said support and respectively, for directionally emitting and receiving acoustic impulses; said transmitter means and receiver means being vertically aligned for emission and detection of acoustic energy in like direction; and means coupled to said support for normally displacing said support and acoustic means to one side of a well bore; said transmitter means including electro-acoustic means for developing acoustic energy traveling longitudinally with respect to said support towards one end of said electro-acoustic means, coupling means attached to said one end for transmitting such developed acoustic energy in a transverse direction, and means attached to said coupling means and having an input matching the acoustic impedance of said electro-acoustic means and an output of different acoustic impedance, said last-mentioned means providing a gradual transition of impedance between said input and output to provide increased efficiency, said receiver means being comprised of a tubular core member of magnetostrictive material, coil windings on said core member and a semitubular acoustic shielding member enclosing said core member and coil windings permitting directional detecting of acoustic energy, said shield member being oriented relative to said displacing means so that the directional detection of acoustic energy is toward said one side of a well bore.

References Cited by the Examiner
UNITED STATES PATENTS

| | | | |
|---|---|---|---|
| 2,391,678 | 12/1945 | Bundy. | |
| 2,407,330 | 9/1946 | Turner | 181—26 |
| 2,421,423 | 6/1947 | Krasnow | 340—18 X |
| 2,427,348 | 9/1947 | Bond et al. | 340—10 |
| 2,428,168 | 9/1947 | Loper | 340—18 |
| 2,430,013 | 11/1947 | Hansell | 340—8 |
| 2,520,938 | 9/1950 | Klein | 340—10 |
| 2,754,925 | 7/1956 | Burke | 181—0.5 |
| 2,761,117 | 8/1956 | Green | 340—8 |
| 2,846,662 | 8/1958 | Sparks | 340—15 |
| 2,876,427 | 3/1959 | Harris | 340—11 |
| 2,903,673 | 9/1959 | Harris | 340—8 |
| 2,920,307 | 1/1960 | Chernosky | 340—17 |
| 2,928,069 | 3/1960 | Petermann. | |
| 2,930,911 | 3/1960 | Halliday et al. | 310—26 |
| 2,938,592 | 5/1960 | Charske et al. | 181—0.5 |
| 2,943,694 | 7/1960 | Goodman | 181—0.5 |
| 2,946,904 | 7/1960 | Renaut | 310—8.2 |
| 3,009,131 | 11/1961 | Woodworth | 181—0.5 |

BENJAMIN A. BORCHELT, *Primary Examiner.*

CARL W. ROBINSON, KATHLEEN H. CLAFFY, SAMUEL FEINBERG, *Examiners.*